H. McN. SHWAB.
TIRE GAGE.
APPLICATION FILED MAY 11, 1918.

1,302,443.

Patented Apr. 29, 1919.

WITNESSES
Edw. Thorpe
A. L. Kitchin

INVENTOR
Hugh M. Shwab
BY
ATTORNEYS

UNITED STATES PATENT OFFICE.

HUGH McNEILLY SHWAB, OF LOUISVILLE, KENTUCKY.

TIRE-GAGE.

1,302,443.	Specification of Letters Patent.	Patented Apr. 29, 1919.

Application filed May 11, 1918. Serial No. 233,943.

*To all whom it may concern:*

Be it known that I, HUGH McNEILLY SHWAB, a citizen of the United States, and a resident of Louisville, in the county of Jefferson and State of Kentucky, have invented a new and Improved Tire-Gage, of which the following is a full, clear, and exact description.

This invention relates to gages for pneumatic tires, and has for an object the provision of an improved arrangement which may be attached at any time to any ordinary valve now in use for indicating the air pressure in the tire.

Another object of the invention is the provision of a gage which may be connected to the valve of an ordinary tire and which is provided with means whereby the tire may be pumped while the gage is in place and indicate during the pumping operation the air pressure in the tire.

Figure 2:
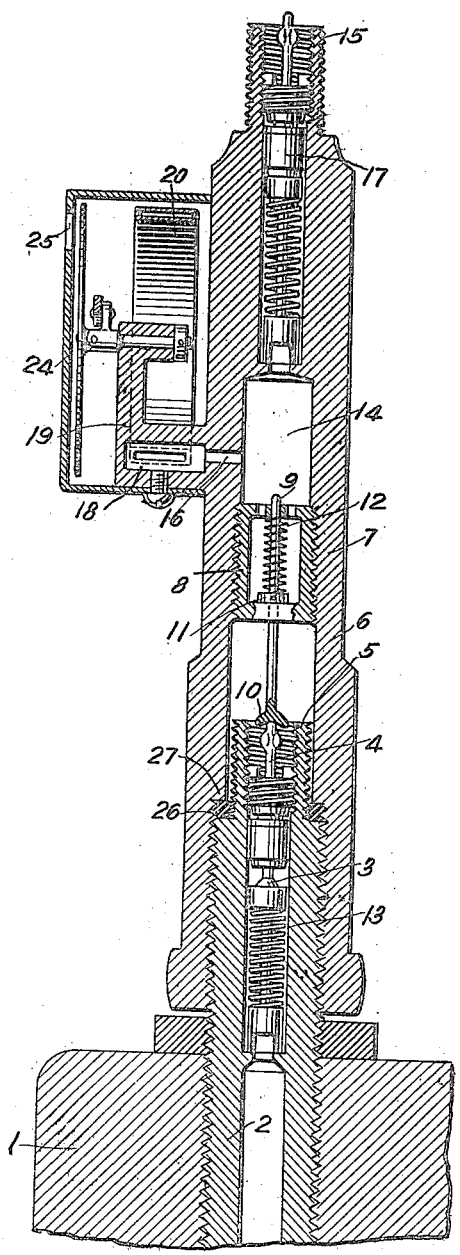
Fig. 2 is a sectional view through Fig. 1 on line 2—2.

Referring to the accompanying drawing by numerals, 1 indicates a felly of any desired kind on which is mounted a tire carrying a valve stem 2, which may be of any desired structure, as for instance of the Schrader type. The valve stem 2 is provided with a valve mechanism, as shown in Fig. 2, including a valve member 3 which is connected with a rod 4 usually extending above the end of the stem so that when it is desired to release the air in the tire to which the stem is connected rod 4 may be depressed and valve 3 unseated. It will, of course, be understood that when a pump is connected with the upper part 5 of the stem 2 and operated, air will pass through the valve stem and unseat valve 3 as it passes so that the tire may be inflated. In small tires, as for instance bicycle tires the inflating thereof may be regulated by the pressure of the hand to determine whether or not the tire is sufficiently provided with compressed air to sustain the desired weight. In large tires, however, as for instance the ordinary automobile tire, this cannot be done so that it is necessary to use some gage, either in the pump, hose from the pump, or on the valve stem. In the present invention means have been provided which are designed to be positioned on an ordinary valve for determining whether or not the air pressure in the tire is sufficient and which may be left in place on the valve or removed as desired.

Figure 1:
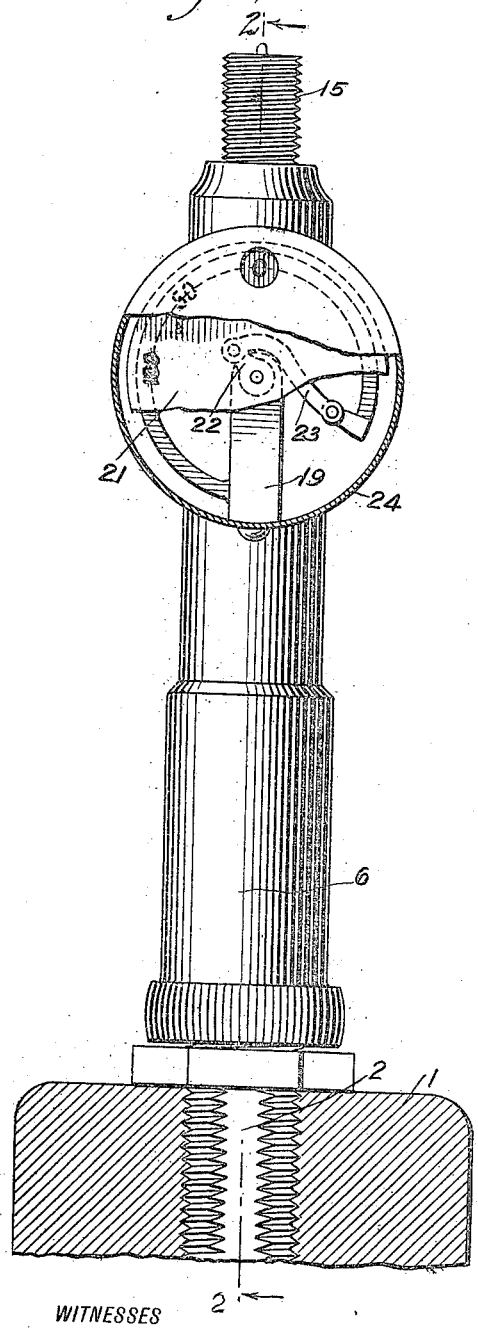
Figure 1 is a side view of the gage embodying the invention, certain parts being broken away for better illustrating the construction.

As shown in Fig. 2 of the drawing the casing 6 is threaded on to the stem 2 and is provided with a threaded section 7 for receiving a sleeve 8, which sleeve carries a reciprocating pin 9 having an enlargement 10 at the lower end which is designed to engage the upper end of the rod 4 for depressing said rod and unseating valve member 3 as soon as the casing 6 has been screwed into position on stem 2. A collar 11 is secured to the pin 9 by a set screw or other desired means and is acted on by spring 12 so as to resiliently hold the pin in a lowered position, but allowing a limited movement thereof if necessary. The spring 12 is preferably stronger than the spring 13 of the valve mechanism in stem 2, in order that the valve member 3 may be opened against the action of spring 13. Above the sleeve 8 is a distributing chamber 14 for the air whereby air entering through an auxiliary stem 15 may be distributed to a gage mechanism through aperture 16 and distributed to the lower part of casing 6 from whence it passes into the valve. In the upper part of the casing 6 a valve mechanism 17 is provided which may be identical with the valve mechanism in stem 2 or may be any desired kind. The valve mechanism 17 is provided so that in case there is not sufficient air in the tire after the device has been applied thereto the pump may be secured to the auxiliary stem 15 and air supplied to chamber 14 and thence into the tire. Of course a small part of the air will pass through the opening 16 into the space 18 in a bracket 19 and thence into an expansible member 20, which is in the form of a flat tube bent into an arc-shaped structure as shown in Fig. 1. As the pressure in the chamber 14 rises the pressure in member 20 as well as in the tire will rise and will move a dial 21, which is connected through a lever 22 and link 23, which in turn is connected pivotally to the free end of the expansible member 20. The dial 21 and associate parts including member 20 are inclosed in a casing 24 which has a window 25 whereby the numbers on the dial 21 may be seen. The parts are set in the drawing to show a movement of one hundred indicating that one hundred pounds per inch is the limit of the device. It is evident that a greater or less number of pounds could be indicated if desired.

It will be noted that when the valve mechanism in stem 2 is held open valve mechanism 17 is closed so that none of the air from the tire may escape. If desired a gasket 26 could be provided and arranged to rest on the shoulder of the stem 2 and against the shoulder 27 of casing 6. The casing 6 and associate parts could be applied to each valve stem of an automobile and left thereon continually or could be applied when desired and then removed when the tire had been properly pumped. If the device is left in place continually the dial 21 will continually show the amount of pressure in the tire.

What I claim is:

A gage comprising a casing having a bore at one end provided with threads near the upper part of the bore, a valve mechanism in said bore, said casing being provided with a second bore extending from the opposite end of the casing, the end of said second mentioned bore merging into a passageway communicating with the first mentioned bore, said second mentioned bore having compartments of three different sizes, the end bore being threaded for its entire length while the third compartment from the end is threaded for part of its length, a sleeve threaded into the third compartment, said sleeve being formed with guiding means, a pin extending through said guiding means, a spring normally holding said pin in a lower position for engaging the plunger of the valve to which the device is to be applied so as to open the same whereby the connecting member of the valve will be in direct communication with said second mentioned bore, and a pressure operated indicator in free communication with the interior of the casing between said valves.

HUGH McNEILLY SHWAB.